(12) United States Patent
Yang et al.

(10) Patent No.: US 12,327,180 B2
(45) Date of Patent: Jun. 10, 2025

(54) CONVOLUTIONAL NEURAL NETWORKS WITH SOFT KERNEL SELECTION

(71) Applicant: Google LLC, Mountain View, CA (US)

(72) Inventors: Brandon Chauloon Yang, Saratoga, CA (US); Quoc V. Le, Sunnyvale, CA (US); Jiquan Ngiam, Mountain View, CA (US); Gabriel Mintzer Bender, Mountain View, CA (US)

(73) Assignee: Google LLC, Mountain View, CA (US)

( * ) Notice: Subject to any disclaimer, the term of this patent is extended or adjusted under 35 U.S.C. 154(b) by 930 days.

(21) Appl. No.: 17/425,283

(22) PCT Filed: Jan. 23, 2020

(86) PCT No.: PCT/US2020/014841
§ 371 (c)(1),
(2) Date: Jul. 22, 2021

(87) PCT Pub. No.: WO2020/154537
PCT Pub. Date: Jul. 30, 2020

(65) Prior Publication Data
US 2022/0129740 A1    Apr. 28, 2022

Related U.S. Application Data

(60) Provisional application No. 62/796,045, filed on Jan. 23, 2019.

(51) Int. Cl.
*G06N 3/063*       (2023.01)
(52) U.S. Cl.
CPC .................................. *G06N 3/063* (2013.01)

(58) Field of Classification Search
CPC ........... G06N 3/063; G06N 3/045; G06N 3/08
See application file for complete search history.

(56) References Cited

U.S. PATENT DOCUMENTS

2016/0140435 A1    5/2016   Bengio et al.
2018/0129893 A1    5/2018   Son et al.
2018/0285715 A1   10/2018   Son et al.

OTHER PUBLICATIONS

Conditional Convolutional Neural Network for Modality-Aware Face Recognition Chao Xiong, Xiaowei Zhao, Danhang Tang, Karlekar Jayashree, Shuicheng Yan, Tae-Kyun Kim; Proceedings of the IEEE International Conference on Computer Vision (ICCV), 2015, pp. 3667-3675 (Year: 2015).*
Bahdanau et al, "Neural machine translation by jointly learning to align and translate" arXiv, 2016, 15 pages.
Bengio et al, "Conditional computation in neural networks for faster models" arXiv, 2015, 9 pages.

(Continued)

*Primary Examiner* — Pei Yong Weng
(74) *Attorney, Agent, or Firm* — Fish & Richardson P.C.

(57) ABSTRACT

Methods, systems, and apparatus, including computer programs encoded on computer storage media, for processing inputs using neural networks that include one or more conditional convolutional layers. A conditional convolutional layer has a plurality of kernels and determines a respective input-dependent weight for each of the plurality of kernels and generates an input-dependent kernel by computing a weighted sum of the plurality of kernels in accordance with the respective input-dependent weights.

20 Claims, 4 Drawing Sheets

(56) References Cited

OTHER PUBLICATIONS

Bengio et al, "Estimating or propagating gradients through stochastic neurons for conditional computation" arXiv, 2013, 12 pages.
Chen et al, "GaterNet: Dynamic filter selection in convolutional neural network via dedicated global gating network" arXiv, 2018, 10 pages.
Cho et al, "Exponentially increasing the capacity-to-computation ratio for conditional computation in deep learning" arXiv, 2014, 6 pages.
Cubak et al, "Autoaugment: Learning augmentation policies from data" arXiv, 2018, 14 pages.
Davis et al, "Low-rank approximations for conditional feedforward computation in deep neural networks" arXiv, 2013, 9 pages.
Eigen et al, "Learning factored representations in a deep mixture of experts" arXiv, 2013, 8 pages.
Fernando et al, "Pathnet: Evolution channels gradient descent in super neural networks" arXiv, 2017, 16 pages.
Ha et al, "Hypernetworks" ICLR, 2017, 18 pages.
Howard et al, "Mobilenets: Efficient convolutional neural networks for mobile vision applications" arXiv, 2017, 9 pages.
Hu et al, "Squeeze-and-excitation networks" IEEE, 2018, 10 pages.
Huang et al, "GPipe: Efficient training of giant neural networks using pipeline parallelism" arXiv, 2018, 11 pages.
Keskin et al, "SplineNets: Continuous neural decision graphs" NIPS, 2018, 11 pages.
Kornblith et al, "Do better imagenet models transfer better?" arXiv, 2018, 21 pages.
Krizhevsky et al, "Imagenet classification with deep convolutional neural networks" NIPS, 2012, 9 pages.
LeCun et al, "Hand-written digit recognition with a back-propagation network" NIPS, 1990, 9 pages.
Lin et al, "Focal loss for dense object detection" IEEE, 2018, 10 pages.
Lin et al, "Microsoft coco: Common objects in context" European Conference on Computer Vision, 2014, 14 pages.
Liu et al, "Dynamic deep neural networks" Optimizing accuracy-efficiency trade-offs by selective execution AAAI, 2018, 8 pages.
Liu et al, "SSD: Single shot multibox detector" Springer, 2016, 17 pages.
Luong et al, "Effective approaches to attention-based neural machine translation" arXiv, 2015, 11 pages.
Mahajan et al, "Exploring the limits of weakly supervised pretraining" arXiv, 2018, 23 pages.
McGill et al, "Deciding how to decide: Dynamic routing in artificial neural networks" arXiv, 2017, 10 pages.
Mullapudi et al, "Hydranets: Specialized dynamic architectures for efficient inference" CVPR, 2018, 10 pages.
PCT International Preliminary Report on Patentability in International Application No. PCT/US2020/014841, dated Aug. 5, 2021, 9 pages.
PCT International Search Report and Written Opinion in International Application No. PCT/US2020/014841, dated May 15, 2020, 14 pages.
Ramachandran et al, "Diversity and depth in per-example routing models" ICLR, 2019, 12 pages.
Real et al, "Regularized evolution for image classifier architecture search" AAAI, 2019, 10 pages.
Rosenbaum et al, "Routing networks: Adaptive selection of non-linear functions for multi-task learning" arXiv, 2017, 16 pages.
Russakovsky et al, "Imagenet large scale visual recognition challenge" IJCV, 2015, 43 pages.
Sandler et al, "Mobilenetv2: Inverted residuals and linear bottlenecks" arXiv, 2018, 14 pages.
Shazeer et al, "Outrageously large neural networks: The sparsely-gated mixture-of-experts layer" ICLR, 2017, 19 pages.
Silberman et al, "Tensorflow-slim image classification model library" 2016, 15 pages.
Teja Mullapudi et al., "Hydranets: Specialized dynamic architectures for efficient inference" IEEE, 2018, 10 pages.
Vaswani et al, "Attention is all you need" NIPS, 2017, 11 pages.
Wang et al, "Skipnet: Learning dynamic routing in convolutional networks" arXiv, 2018, 19 pages.
Wu et al, "Blockdrop: Dynamic inference paths in residual networks" arXiv, 2019, 11 pages.
Xiong et al, "Conditional Convolutional Neural Network for Modality-Aware Face Recognition" IEEE, 2015, 9 pages.
Zhang et al, "Mixup: beyond empirical risk minimization" arXiv, 2017.
Office Action in Chinese Appln. No. 202080010184.3, dated on Jul. 30, 2024, 14 pages (with English translation).
Office Action in European Appln. No. 20708746.1, mailed on Jun. 14, 2023, 6 pages.
Tan et al., "MnasNet: Platform-Aware Neural Architecture Search for Mobile," CoRR, Submitted on Jul. 31, 2018, arXiv:1807.11626v1, pp. 1-9.
Zhang et al., "Shufflenet: An extremely efficient convolutional neural network for mobile devices,"Paper, Presented at Proceedings of the IEEE/CVF Conference: Computer Vision and Pattern Recognition, Salt Lake City, UT, Jun. 18-23, 2018, pp. 6848-6856.
Zoph et al., "Neural architecture search with reinforcement learning," Paper, Presented at Proceedings of the International Conference on Learning Representations, Toulon, France, Apr. 24-26, 2017, pp. 1-16.

* cited by examiner

CONVOLUTIONAL NEURAL NETWORKS WITH SOFT KERNEL SELECTION

CROSS-REFERENCE TO RELATED APPLICATION

This application is a national phase entry under 35 U.S.C. 371 of PCT Application Serial No. PCT/US2020/014841, filed Jan. 23, 2020, which claims priority to provisional U.S. Patent Application No. 62/796,045, filed Jan. 23, 2019, the entirety of which is herein incorporated by reference.

BACKGROUND

This specification relates to processing inputs using convolutional neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Convolutional neural networks have achieved state-of-the-art performance on many tasks in computer vision.

SUMMARY

This specification describes a system implemented as computer programs on one or more computers in one or more locations that processes a network input using a convolutional neural network to generate a network output for the network input. In particular, the convolutional neural network includes one or more conditional convolutional layers that each have increased computational capacity relative to a conventional convolutional layer with minimal increase in computational overhead, i.e., a minimal increase in processing power used to perform an inference for the neural network relative to a neural network that has only conventional convolutional neural network layers.

Particular embodiments of the subject matter described in this specification can be implemented so as to realize one or more of the following advantages.

The described techniques allow a neural network to have an increased size with only a small increase in inference cost. In particular, by augmenting a neural network with the described input-dependent conditional computation, i.e., with one or more conditional convolutional layers, the performance of the neural network on a variety of tasks, e.g., image classification or object detection, can be improved relative to the performance of the neural network if the conditional convolutional layers are replaced with conventional convolutional layers. More specifically, these additional performance gains are realized at least in part because the weights for the various kernels of the conditional convolutional layer are generated in an input-dependent manner. Additionally, this improvement can be realized with minimal computational overhead, i.e., with only minimal increases in computational complexity and resource consumption, e.g., processing power and memory consumption. In particular, the conditional convolutional layer still performs only a single convolution and thus the only additional computational expense is incurred by generating the weights and determining the weighted sum of the kernels, which has a minimal computational cost relative to the cost of performing the convolution. Thus, significant increases in performance can be realized without a corresponding significant increase in resource usage.

Some conventional approaches to increasing model capacity utilize conditional computation. In conditional computation models, the increase is achieved by activating only a portion of the entire network for each example. However, conditional computation models are often challenging to train, since they require learning discrete routing decisions from individual examples to different portions of the network. Unlike these approaches, the described techniques do not require discrete routing of examples, so can be easily optimized with gradient descent.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
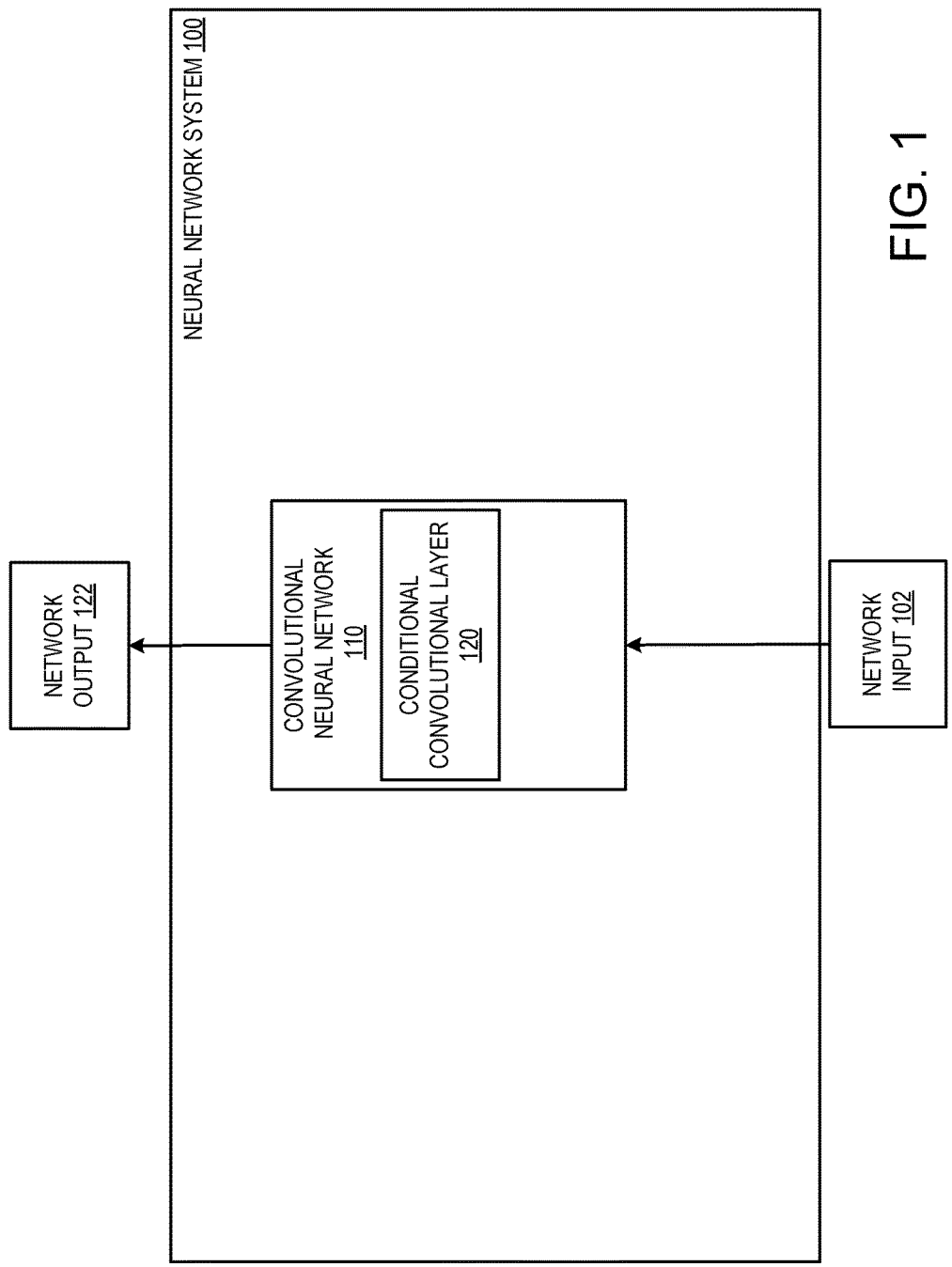
FIG. 1 shows an example neural network system.

This specification describes a system implemented as computer programs on one or more computers in one or more locations that processes a network input using a convolutional neural network to generate a network output for the network input, i.e., to perform a machine learning task on received network inputs. In particular, the convolutional neural network includes one or more conditional convolutional layers that each have increased computational capacity relative to a conventional convolutional layer with minimal increase in computational overhead, i.e., a minimal increase in processing power used to perform an inference for the neural network relative to a neural network that has only conventional convolutional neural network layers.

In some cases, the network input includes visual data and the task is a computer vision task.

In some cases, the network input includes one or more images and the task is an image processing task.

For example, the image processing task can be image classification, where the image processing output is a set of scores, each score corresponding to a different object class and representing the likelihood that the one or more images depict an object belonging to the object class.

As another example, the image processing task can be object detection, where the image processing output identifies one or more regions in the one or more images and, for each region, a likelihood that region depicts an object of interest.

As another example, the image processing task can be image segmentation, where the image processing output defines, for each pixel in the one or more images, a respective likelihood for each category in a predetermined set of categories. For example, the set of categories can be foreground and background. As another example, the set of categories can be object classes.

As another example, the image processing task can be depth estimation, where the image processing output defines, for each pixel in the one or more images, a respective depth value.

As another example, the image processing task can be motion estimation, where the network input includes multiple images, and the image processing output defines, for each pixel of one of the input images, a motion of the scene depicted at the pixel between the images in the network input.

As another example, the task may comprise real-time, server side video processing or real-time, on-vehicle perception for self-driving cars.

In some other cases, the network input can be a sequence and the output can be a sequence of a different type. For example, the network input can be a sequence in a source language and the output can be a sequence of text in a target language that is translation of the input sequence into the target language. As another example, the network input can be an audio sequence representing an utterance and the output sequence can be a sequence of text that is a transcription of the utterance. As yet another example, the input sequence can be a sequence of text or of linguistic features of the text and the output sequence can be an audio sequence, e.g., a sequence of audio samples, e.g., amplitude values, that is a verbalization of the input text.

FIG. 1 shows an example neural network system 100. The neural network system 100 is an example of a system implemented as computer programs on one or more computers in one or more locations in which the systems, components, and techniques described below are implemented.

The system 100 receives a network input 102 processes the network input 102 to generate a network output 122 for the network input 102.

In particular, the system 100 generates the network output 122 by processing the network input 102 through a convolutional neural network 110.

The convolutional neural network 110 includes one or more conditional convolutional layers 120 (referred to below as a "first convolutional layer"). Like a conventional convolutional layer, the conditional convolutional layer 120 receives an input tensor and generates an output tensor from the input tensor. However, unlike a conventional layer, the conditional convolutional layer 120 implements "soft kernel selection," a type of input conditional computation that increases the computational capacity of the layer with a minimal increase in computational overhead.

While a single conditional convolutional layer 120 is shown in FIG. 1, in practice the convolutional neural network 110 can have any number of conditional convolutional layers 120. For example, some or all of the conventional convolutional layers in an existing neural network architecture can be replaced with conditional convolutional layers 120 to generate the architecture for the convolutional neural network 110.

Thus, the convolutional neural network 110 includes one or more conditional convolutional layers 120 and, in some cases, one or more other types of neural network layers, e.g., conventional convolutional layers, fully-connected layers, pooling layers, softmax layers, and so on. In general, the convolutional neural network 110 can have any architecture that includes at least one conditional convolutional layer 120 and is adapted to receive the type of input and generate the type out of output that are required for the machine learning task.

In particular, each conditional convolutional layer 120 has a set of multiple kernels.

When a given input tensor to the convolutional layer 120 is received, the system 100 generates a respective input-dependent weight for each of the multiple kernels from the input tensor. The input-dependent weight is referred to "input-dependent" because the system 100 generates the weight based on the input tensor to the convolutional layer 120, with different input tensors resulting in different weights for the various kernels of the conditional convolutional layer 120. Generating the input-dependent weights will be described in more detail below with reference to FIG. 3.

The system 100 then generates an input-dependent kernel by computing a weighted sum of the set of kernels in accordance with the respective input-dependent weights, i.e., a sum with each kernel being assigned the weight that was generated for the kernel. This can be seen as performing soft kernel selection between the multiple kernels of the conditional convolutional layer 120.

The system 100 then generates an output tensor for the conditional convolutional layer 120 from the input tensor for the conditional convolutional layer. As part of generating the output tensor, the system performs a convolution between the input-dependent kernel and the input tensor. Because the weighted sum of the kernels is performed before applying a single input-dependent kernel, the size and computational complexity of the convolution is the same as one that would be applied by a conventional convolutional layer that has a single kernel.

The system 100 may also perform other operations on the output of this convolution, e.g., by applying batch normalization, an activation function, or both to the convolution output, in order to generate the output tensor of the conditional convolutional layer 120.

Because the processing required to generate the weights and to compute the weighted sum is relatively much cheaper than performing a convolution and because the convolution is the same size as for a layer with only a single kernel, the described techniques increase the size and performance of the convolutional neural network with only minimal increases in computational overhead.

Figure 2:
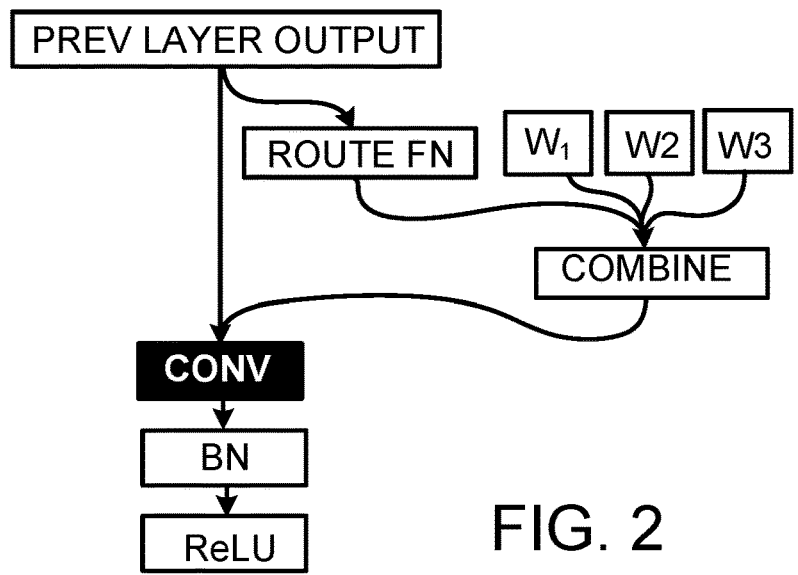
FIG. 2 illustrates the operation of an example conditional convolutional layer.

FIG. 2 shows the operation of an example conditional convolutional layer. In the example of FIG. 2, the conditional convolutional layer has three kernels: W1, W2, and W3.

As can be seen in FIG. 2, the conditional convolutional layer receives, as input, an input tensor that has been generated by the previous layer ("PREV LAYER OUTPUT") in the convolutional neural network. Generally, the input tensor is a multi-dimensional array. For example, the input tensor can be an X by Y by Z feature map generated from an input image. As another example, the input tensor can be an X by D matrix of feature vectors generated from an input sequence.

The system applies a routing function ("ROUTE FN") to generate a respective input-dependent weight for each of the three kernels W1, W2, and W3 and then combines ("COMBINE") the three kernels in accordance with the respective input-dependent weights to generate a combined kernel.

The system then computes a convolution between the input tensor ("PREV LAYER OUTPUT") and the combined kernel to generate a convolution output.

For a given input tensor x, these operations can be expressed as:

$$\text{Output}(x) = (\alpha_1 \cdot W_1 + \alpha_2 \cdot W_2 + \alpha_3 \cdot W_3) * x,$$

where $\alpha_1$, $\alpha_2$, and $\alpha_3$ are the respective input-dependent weights, and the * denotes convolution.

The type of convolution applied by the conditional convolutional layer depends on the architecture of the convolutional neural network. For example, the convolution can be a standard convolution, a pointwise convolution, or a depthwise convolution, depending on the architecture of the convolutional neural network and where in the architecture the conditional convolutional layer is placed—different conditional convolutional layers within the same neural network can perform different types of convolutions.

Advantageously, the kernels are combined before the single convolution is performed, i.e., rather than computing three separate convolutions with three separate kernels, and therefore only a single convolution is required to be performed in order to generate the convolution output.

In the example of FIG. 2, the conditional convolutional layer then applies batch normalization ("BN") to the convolution output to generate a batch normalized output and then applies a rectified linear unit activation function (ReLU) to generate the output tensor for the conditional convolutional layer. In general, however, any given conditional convolution layer can apply conventional neural network operation to the convolution output to generate the output tensor for the layer. In some cases, the system directly uses the convolution output as the output of the conditional convolutional layer.

The system can then provide the output tensor as an input to the next layer in the convolutional neural network.

Figure 3:
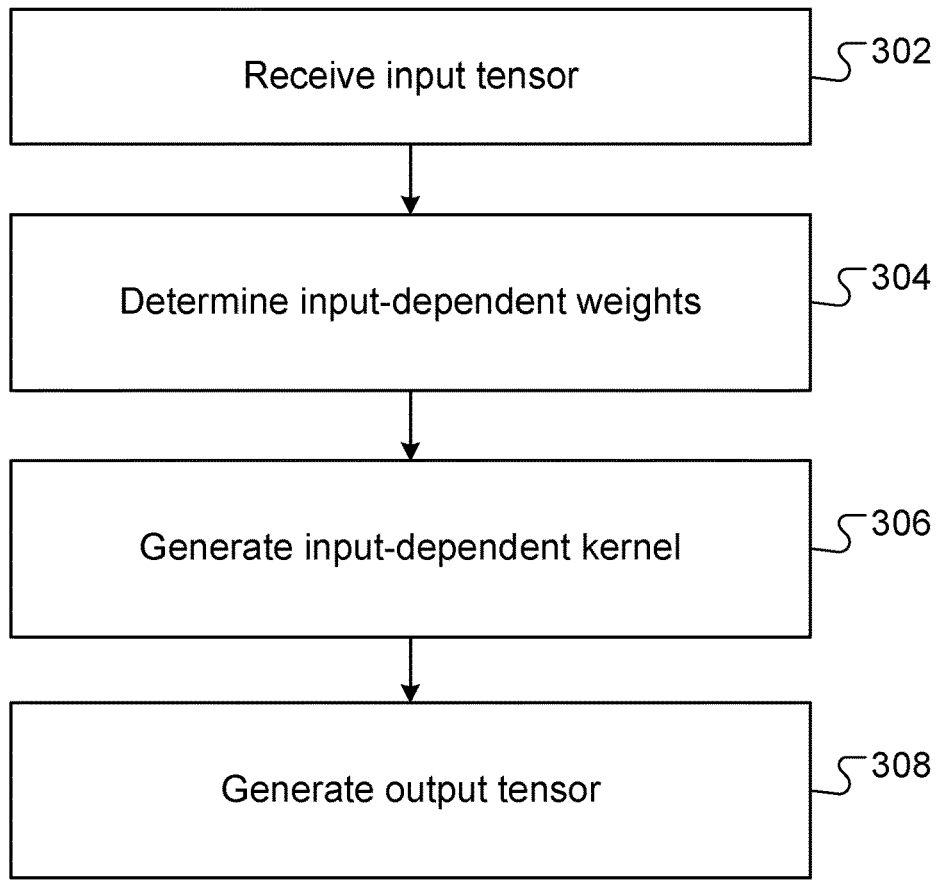
FIG. 3 is a flow diagram of an example process for processing a network input to generate an image processing output.

FIG. 3 is a flow diagram of an example process 300 for processing a network input to generate a network output. For convenience, the process 300 will be described as being performed by a system of one or more computers located in one or more locations. For example, an neural network system, e.g., the neural network system 100 of FIG. 1, appropriately programmed, can perform the process 300.

The system receives an input tensor for a first convolutional layer of the plurality of convolutional layers in the image processing neural network (step 302). Generally, the input tensor is derived from the network input, i.e., the network input has been processed through one or more other layers in the convolutional neural network to generate the network input. The first convolutional layer is a conditional convolutional layer that, unlike a conventional convolutional layer, has a plurality of kernels.

The system determines, from the input tensor, a respective input-dependent weight for each of the plurality of kernels (step 304).

In particular, the system processes the input tensor through a non-linear routing function having a plurality of parameters to generate the respective input-dependent weights for the plurality of kernels.

Generally, the routing function includes one more neural network layers that collectively transform the input tensor into a vector that has a respective value for each of the kernels.

In some implementations, the neural network layers include a global average pooling layer that performs global average pooling across the spatial dimensions of the input tensor. That is, the non-linear routing function first applies global average pooling to the input tensor to generate a pooled tensor and then applies additional, parameter-dependent operations to the average pooled tensor to generate the input-dependent weights. A convolution operation operates only over local receptive fields, so by employing global average pooling, the routing function allows adaptation of these local operations using global context from within the entire input tensor.

As an example, the additional, parameter-dependent operations can include processing the average pooled tensor through one or more fully-connected layers and then processing the output of the fully-connected layers through a non-linearity, e.g., a Sigmoid activation function, to generate the weights.

In some implementations, when the neural network includes multiple conditional convolutional layers, the system can perform the routing, i.e., generate the routing weights, independently for each conditional convolutional layer.

In some other implementations, to reduce computational overhead when the neural network includes multiple conditional convolutional layers, the system can share routing weights between certain ones of the conditional convolutional layers. For example, the system can share the routing weights between each conditional convolutional layer in a given block of multiple convolutional layers, i.e., compute new weights only for the first layer in each block and then maintain the same weights for the remainder of the layers in the block. As another example, the system can share the routing weights between every other or every third conditional convolutional layer in the neural network. Nonetheless, in each of these examples, the routing weights for any given conditional convolutional layer are still dependent on the current network input and will generally be different for different network inputs (and, therefore, for different inputs to the conditional convolutional layer).

The system generates an input-dependent kernel by computing a weighted sum of the plurality of kernels in accordance with the respective input-dependent weights (step 306).

The system generates an output tensor for the first convolutional layer from the input tensor for the first convolutional layer (step 308). As part of generating the output tensor, the system performs a convolution between the input-dependent kernel and the input tensor. Thus, even though the first convolutional layer has multiple kernels, the system performs only a single convolution with a single, combined kernel when generating the output of the first convolutional layer.

The system can perform the process 300 after the neural network has been trained as part of generating a new network output for a new network input. The system can also perform the process 300 during the training of the neural network on a set of training inputs to determine trained values of the parameters of the convolutional neural network, e.g., the kernels of the conditional convolutional layers and the parameters of the routing functions for the conditional convolutional layers. When the process 300 is performed during training, the system can compute a gradient with respect to the network parameters of an objective function that measures the quality of the network output relative to a target output for the network input and use the gradient to update the parameters using a conventional machine learning technique, e.g., Adam, rmsProp, or stochastic gradient descent.

In some other cases, however, the system computes output tensors for the conditional convolutional layer differently during the training of the neural network. That is, after training, the system can compute the outputs using the process 300, while during training, the system can compute the outputs using a different process that is described below with reference to FIG. 4.

Figure 4:
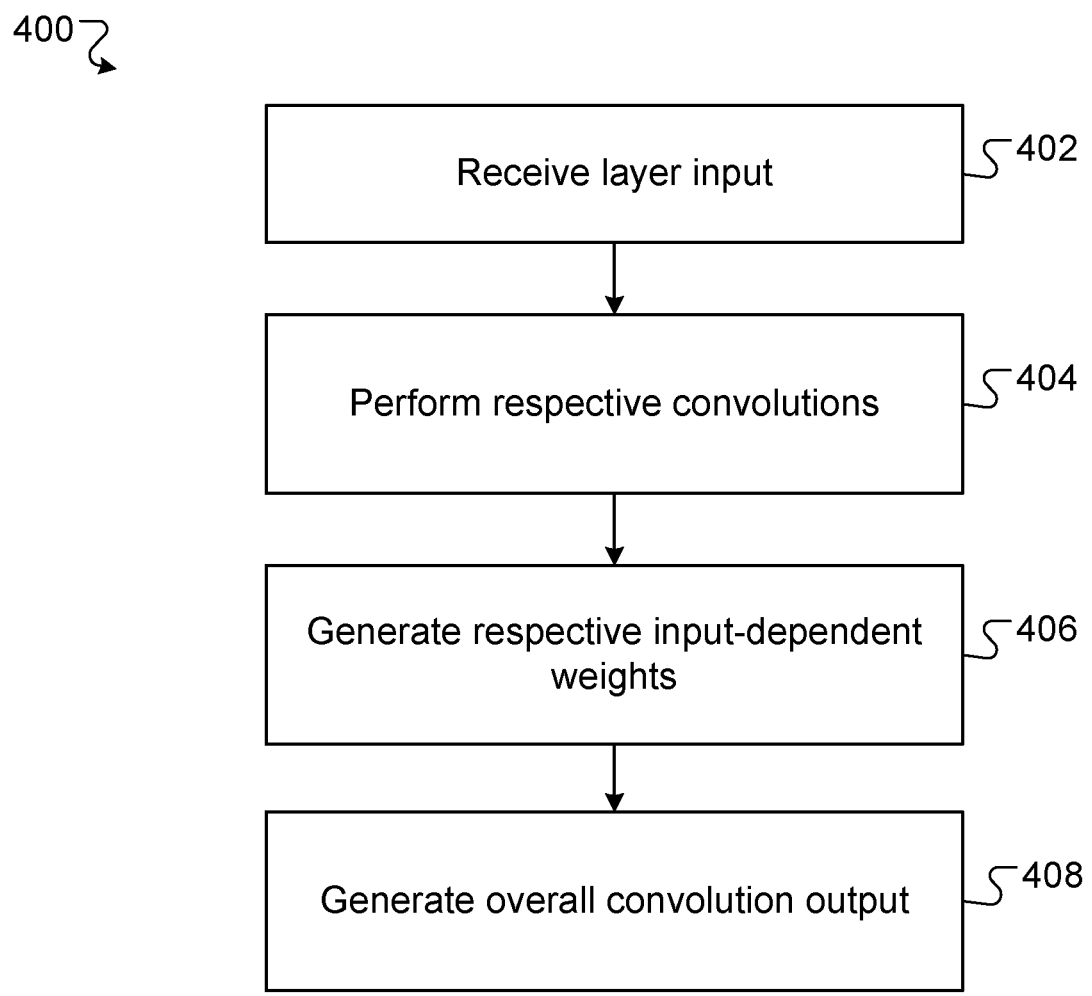
FIG. 4 is a flow diagram of an example process for generating the output of a conditional convolutional layer during the training the neural network.

FIG. 4 is a flow diagram of an example process 400 for generating an output tensor for the conditional convolutional layer during training. For convenience, the process 400 will be described as being performed by a system of one or more computers located in one or more locations. For example, an neural network system, e.g., the neural network system 100 of FIG. 1, appropriately programmed, can perform the process 400.

The system receives a layer input for the first convolutional layer (step 402).

The system performs a respective convolution between the layer input and each of the plurality of kernels in accordance with current values of the kernels to generate a respective convolution output for each kernel (step 404). That is, unlike in the process 300, the system performs a different convolution for each of the multiple kernels of the first convolutional layer.

The system processes the input tensor through the routing function in accordance with current values of the parameters of the non-linear routing function to generate a respective input-dependent weight for each of the plurality of kernels (step 406).

The system generates an overall convolution output for the first convolutional layer by computing a weighted sum of the convolution outputs for the kernels in accordance with input-dependent weights (step 408). Thus, unlike in the process 300, the system combines the convolution outputs after the individual convolutions have been performed to generate the overall convolution output.

Once a network output has been generated for the training input, the system can determine a gradient with respect to the network parameters, including the plurality of kernels and the parameters of the non-linear routing function, of the objective function and update the current values of the parameters and the kernels using the gradients.

In some implementations, the system determines whether to use the process 300 or the process 400 for a given conditional convolutional layer during training based on how many kernels the conditional convolutional layer has. In particular, many hardware accelerators that are used for neural network training are optimized to train on large batch convolutions, and it is difficult to fully utilize them for small batch sizes. Thus, with small numbers of kernels (e.g., less than or equal to 4), it may be more efficient to train conditional convolutional layers using the process 400 and large batch convolutions and then use process 300 for inference after training. With larger numbers of kernels (e.g., greater than 4), training conditional convolutional layers directly with process 300 may be more efficient.

Figure 5:
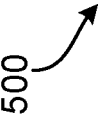
FIG. 5 is a table showing the performance of neural networks having conditional convolutional layers relative to baseline neural networks.

FIG. 5 is a table 500 showing the performance of neural networks having conditional convolutional layers relative to baseline neural networks.

In particular, for each of five baseline neural networks (MobileNetV1 (1.0x), MobileNetV2 (1.0x), MnasNet-A1, ResNet-50, and EfficientNet-B0), the table 500 shows the computational cost in terms of the number of multiply-adds (MADDs) required to compute an output for the baseline network and the top-1 accuracy percentage (Top-1) of the baseline neural network on the task of image classification on the ImageNet 2012 dataset.

For each of the five baseline neural networks, table 500 also shows the performance of a modified version of the neural network ("CondConv") that was generated by replacing the convolutional layers in the baseline neural network with conditional convolutional layers that have eight kernels. As can be seen from the table 500, CondConv improves the accuracy of all baseline neural networks with small relative increase in inference cost (<10%).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of processing a network input through a convolutional neural network to generate a network output for the network input, wherein the convolutional neural network comprises a plurality of convolutional layers, and wherein the method comprises:
   receiving an input tensor for a first convolutional layer of the plurality of convolutional layers in the image processing neural network, the first convolutional layer having a plurality of kernels, and the input tensor being derived from the network input;
   determining, from the input tensor, a respective input-dependent weight for each of the plurality of kernels, comprising:
      processing the input tensor through a non-linear routing function having a plurality of parameters to generate the respective input-dependent weights for the plurality of kernels;
   generating an input-dependent kernel by computing a weighted sum of the plurality of kernels in accordance with the respective input-dependent weights; and
   generating an output tensor for the first convolutional layer from the input tensor for the first convolutional layer, comprising performing a convolution between the input-dependent kernel and the input tensor.

2. The computer-implemented method of claim 1, wherein the network input comprises visual data and wherein generating the network output comprises performing a computer vision task on the visual data.

3. The computer-implemented method of claim 2, wherein the network input includes one or more images and the computer vision task comprises one of:
   image classification, wherein the network output comprises a plurality of scores, each score corresponding to a different object class representing the likelihood that the one or more images depict an object belonging to the object class;
   object detection, wherein the network output identifies one or more regions in the one or more images and, for each region, a likelihood that the region depicts an object of interest;
   image segmentation, wherein the network output defines, for each pixel in the one or more images, a respective likelihood for each category in a predetermined set of categories;
   depth estimation, wherein the network output, defines, for each pixel in the one or more images, a respective depth value, or
   motion estimation, wherein the image processing output defines, for each pixel of one of the input images, a motion of the scene depicted at the pixel between the images in the network input.

4. The method of claim 1, wherein the non-linear routing function includes one or more neural network layers.

5. The method of claim 4, wherein the one or more neural network layers include a global average pooling layer that performs global average pooling across the spatial dimensions of the input tensor.

6. The method of claim 5, wherein the global average pooling layer is followed by one or more fully-connected layers and a non-linearity.

7. The method of claim 1, wherein generating an output tensor further comprises:
   applying batch normalization and an activation function to an output of the convolution.

8. The method of claim 1, wherein the convolution is a depthwise convolution.

9. The method of claim 1, wherein the convolution is a pointwise convolution.

10. A method performed by one or more computers and for training a convolutional neural network to determine trained values of a plurality of kernels of a first convolutional layer of the convolutional neural network and to determine trained values of parameters of a non-linear routing function that processes an input tensor to the first convolutional layer to generate a respective input-dependent weight for each of the plurality of kernels, the method comprising:
   receiving a plurality of training inputs;
   processing each training input through the convolutional neural network to generate a training output for each training input, comprising, for each training input:
      receiving a layer input for the first convolutional layer;
      performing a respective convolution between the layer input and each of the plurality of kernels in accordance with current values of the kernels to generate a respective convolution output for each kernel;
      processing the input tensor through the non-linear routing function in accordance with current values of the parameters of the non-linear routing function to generate a respective input-dependent weight for each of the plurality of kernels; and
      generating an overall convolution output for the first convolutional layer by computing a weighted sum of the convolution outputs for the kernels in accordance with input-dependent weights;
   determining, for each training input, gradients with respect to the plurality of kernels and the parameters of the non-linear routing function of an objective function that measures a quality of the training output for the training input; and
   updating the current values of the parameters and the kernels using the gradients.

11. A system comprising one or more computers and one or more storage devices storing instructions that when executed by the one or more computers cause the one or more computers to perform operations for processing a network input through a convolutional neural network to generate a network output for the network input, wherein the convolutional neural network comprises a plurality of convolutional layers, and wherein the operations comprise:

receiving an input tensor for a first convolutional layer of the plurality of convolutional layers in the image processing neural network, the first convolutional layer having a plurality of kernels, and the input tensor being derived from the network input;

determining, from the input tensor, a respective input-dependent weight for each of the plurality of kernels, comprising:

processing the input tensor through a non-linear routing function having a plurality of parameters to generate the respective input-dependent weights for the plurality of kernels;

generating an input-dependent kernel by computing a weighted sum of the plurality of kernels in accordance with the respective input-dependent weights; and generating an output tensor for the first convolutional layer from the input tensor for the first convolutional layer, comprising performing a convolution between the input-dependent kernel and the input tensor.

12. The system of claim 11, wherein the network input comprises visual data and wherein generating the network output comprises performing a computer vision task on the visual data.

13. The system of claim 12, wherein the network input includes one or more images and the computer vision task comprises one of:

image classification, wherein the network output comprises a plurality of scores, each score corresponding to a different object class representing the likelihood that the one or more images depict an object belonging to the object class;

object detection, wherein the network output identifies one or more regions in the one or more images and, for each region, a likelihood that the region depicts an object of interest;

image segmentation, wherein the network output defines, for each pixel in the one or more images, a respective likelihood for each category in a predetermined set of categories;

depth estimation, wherein the network output, defines, for each pixel in the one or more images, a respective depth value, or motion estimation, wherein the image processing output defines, for each pixel of one of the input images, a motion of the scene depicted at the pixel between the images in the network input.

14. The system of claim 13, wherein the non-linear routing function includes one or more neural network layers.

15. The system of claim 14, wherein the one or more neural network layers include a global average pooling layer that performs global average pooling across the spatial dimensions of the input tensor.

16. The system of claim 15, wherein the global average pooling layer is followed by one or more fully-connected layers and a non-linearity.

17. The system of claim 11, wherein generating an output tensor further comprises:

applying batch normalization and an activation function to an output of the convolution.

18. The system of claim 11, wherein the convolution is a depthwise convolution.

19. The method of claim 10, wherein the non-linear routing function includes one or more neural network layers.

20. The method of claim 19, wherein the one or more neural network layers include a global average pooling layer that performs global average pooling across the spatial dimensions of the input tensor.

* * * * *